United States Patent [19]

Kobelt

[11] 4,108,285

[45] Aug. 22, 1978

[54] CALIPER BRAKE ACTUATING CYLINDER

[76] Inventor: Jacob Kobelt, 6110 Oak St., Vancouver, B.C., Canada, V6M 2W2

[21] Appl. No.: 779,914

[22] Filed: Mar. 21, 1977

[51] Int. Cl.$^2$ .............................................. F16D 55/26
[52] U.S. Cl. .................................... 188/72.6; 92/50; 92/130 R; 188/72.3; 188/72.9; 188/153 D
[58] Field of Search .................. 188/59, 72.3, 72.6, 188/72.9, 72.4, 72.5, 153 R, 153 A, 153 D, 361, 362, 363, 364, 365, 368, 369, 370, 216; 92/130 D, 130 R, 50, 69, 75; 192/85 AA, 85 CA

[56] References Cited

U.S. PATENT DOCUMENTS

| | | | |
|---|---|---|---|
| 1,936,602 | 11/1933 | Karg | 92/50 |
| 2,228,818 | 1/1941 | Eksergian | 188/72.6 X |
| 2,830,681 | 4/1958 | Schilling | 188/72.3 |
| 2,942,507 | 6/1960 | Fischer et al. | 92/130 D X |
| 3,815,471 | 6/1974 | Kobelt | 92/130 D X |

*Primary Examiner*—George E. A. Halvosa
*Attorney, Agent, or Firm*—Carver and Company

[57] ABSTRACT

Pneumatic caliper brake actuator having diaphragm, piston member and cylinder body. Cylinder body has outer portions having clearance recesses therein to accept the outer ends of arms carrying brake shoes. At least two return compression springs extend between the piston member and outer portion of cylinder body, the springs having outer ends straddling the clearance recess and inner ends against piston member to retract piston when fluid pressure is reduced. The clearance recesses are hollow projections positioned off-center and symmetrically relative to outer portion of cylinder and spaced apart to accept arm outer end therebetween and accept outer ends of the return springs therein to restrict lateral movement of springs. Overall dimension across outer faces of projections on opposite sides of the cylinders is approximately equal to an overall dimension across the outer portions of the opposed arms. This results in extreme outer portions of moving portions of the caliper being generally within planes containing fixed portions of the caliper, resulting in an overall dimension across outer ends of the arms being less than would be possible with a single spring as used in prior art cylinders.

10 Claims, 5 Drawing Figures

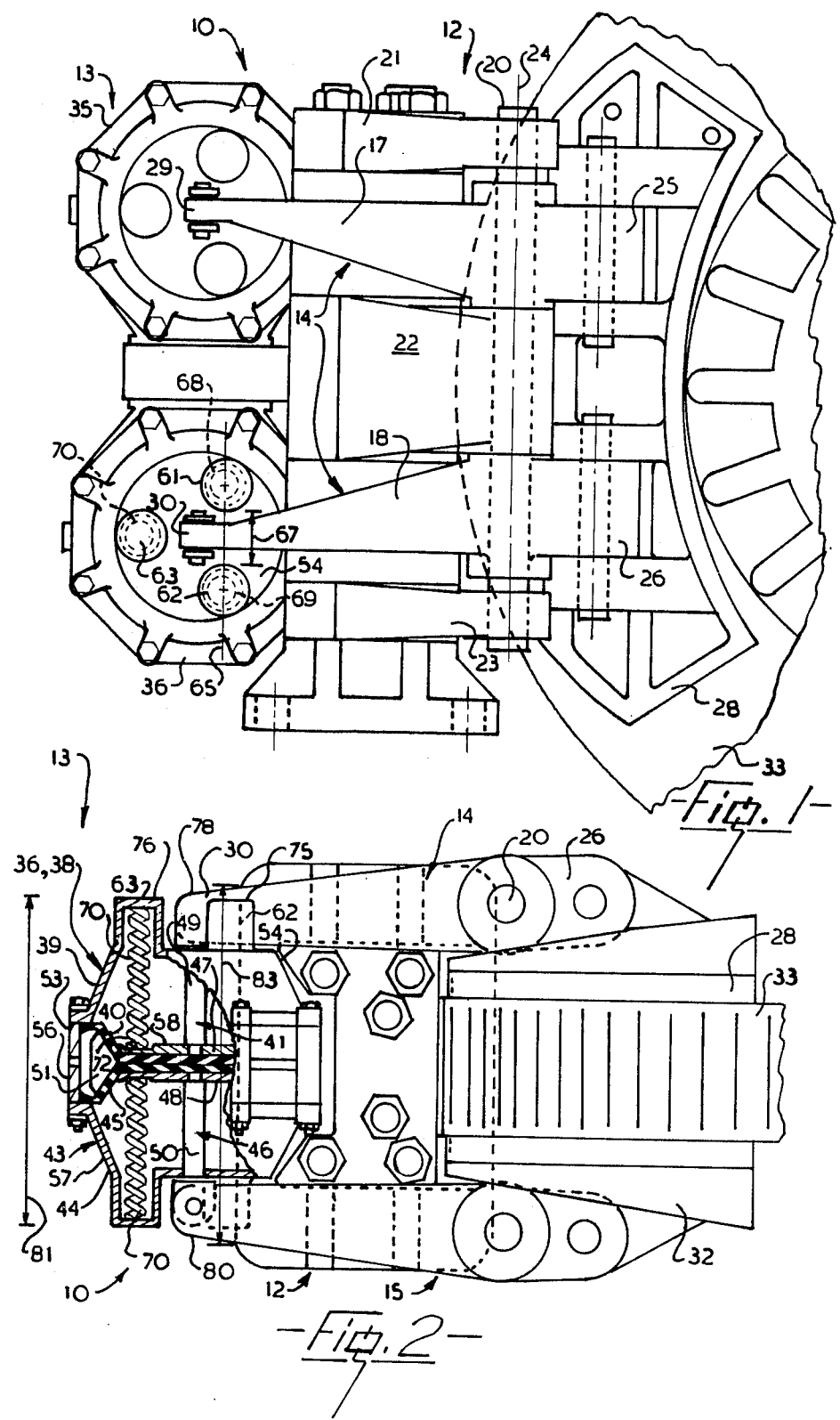

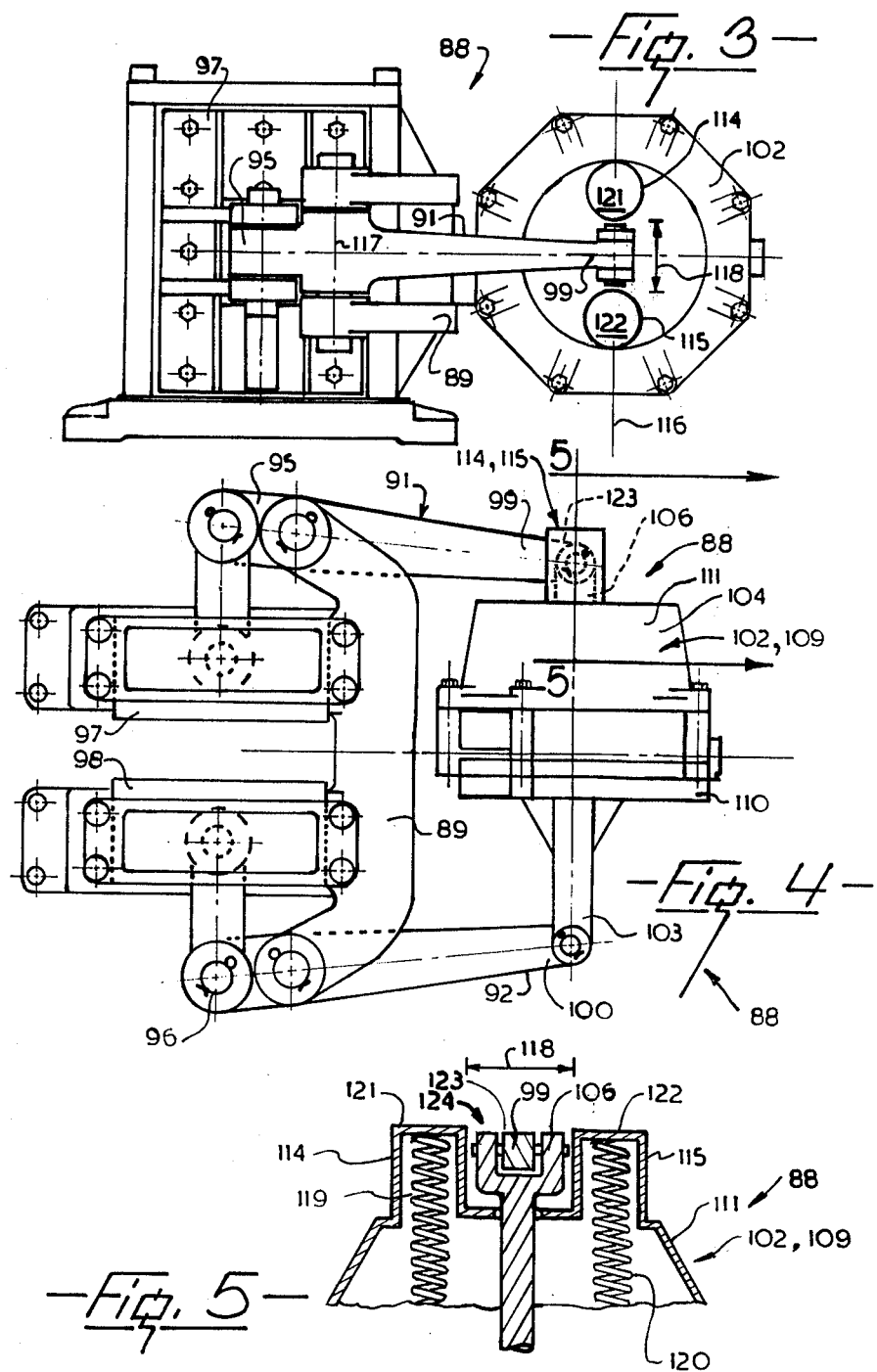

CALIPER BRAKE ACTUATING CYLINDER

BACKGROUND OF THE INVENTION

1. Field of the Invention

The invention relates to a caliper brake actuating cylinder particularly adapted for air actuated disc brakes.

2. Prior Art

Air-actuated disc brakes are used in many applications and are characterized by a caliper brake assembly having a frame and a pair of arms hinged to the frame with brake shoes at inner ends of the arms and an actuator at outer ends of the arms. Commonly the actuator is a pneumatic diaphragm cylinder, and often installation space restrictions dictate the size and stroke of the cylinder which results in design compromises where the disc brake has an insufficient safety margin in braking capacity. Increasing the numbers of actuators and size of brake shoes and brake arms to increase braking force can alleviate some of the problems, but often a major factor causing the compromises is that there is insufficient space in the installation to accommodate an overall dimension across outer ends of the arms where the arms cooperate with the actuator.

SUMMARY OF THE INVENTION

The invention reduces some of the difficulties and disadvantages of the prior art by providing a caliper brake actuator which has a clearance recess in the actuator to permit the outer ends of the arms to retract further than in the prior art devices. The clearance reduces overall dimensions of the actuator without materially reducing braking effectiveness, thus permitting installation of the caliper brake assembly in restricted spaces that otherwise would be unsuitable for a prior art actuator.

The caliper brake actuator according to the invention is for use in a caliper brake assembly having a frame, a pair of arm means hinged to the frame and having inner ends carrying opposed brake shoes and outer ends adapted to cooperate with the actuator. The actuator has an actuator body, a diaphragm and a piston member, the diaphragm and piston member cooperating with the actuator body to permit the piston member to reciprocate within the body in response to fluid pressure applied to the diaphragm. The brake actuator is particularly characterized by the actuator body having a first cylinder having inner and outer portions, one of the portions having an adjacent hollow projecting portion having a closed outer end with an outer face. The projecting portion defines in part a clearance recess having a size sufficient to accept the outer end of one of the arm means therein so that an outer portion of the arm means is essentially coplanar with the outer face of the projecting portion. At least two compression springs extend between the piston member and the cylinder, each spring having one end located within the projecting portion and an opposite end cooperating with the piston member. The springs are positioned so as to straddle the clearance recess and to move the piston member when the fluid pressure is reduced.

A detailed disclosure following, related to drawings, describes a preferred embodiment of the invention which however is capable of expression in structure other than that particularly described and illustrated.

DESCRIPTION OF THE DRAWINGS

FIG. 1 is a simplified fragmented side elevation of a brake actuator according to the invention, portions of a brake disc only being shown, FIG. 2 is a simplified fragmented section showing portions of the actuator of FIG. 1, some portions being omitted for clarity, FIG. 3 is a simplified fragmented side elevation of an alternative simplified brake actuator according to the invention, FIG. 4 is a simplified fragmented plan of the actuator of FIG. 3, FIG. 5 is a simplified fragmented section on line 5—5 of FIG. 4.

DETAILED DISCLOSURE

FIGS. 1 and 2

A caliper brake assembly 10 has a frame 12, a brake actuator 13 which is suitably a plurality of air actuated extensible diaphragm cylinders as will be described, and a pair of arm means 14 and 15 hinged to the frame for swinging thereabouts. The arm means 14 has first and second arms 17 and 18 journalled on a hinge pin 20 carried in three pin mountings 21, 22 and 23 of the frame which permits limited rotation of the arms about a hinge axis 24. The arms 17 and 18 have inner ends 25 and 26 carrying a brake shoe 28, and outer ends 29 and 30 adapted to cooperate with the actuator 13. The arm means 15 is generally similar to the arm means 14 and carries a brake shoe 32 at the outer end thereof and cooperates with the actuator 13 at the outer end thereof. Thus the arm means are hinged to the frame and have inner ends carrying opposed brake shoes and outer ends adapted to cooperate with the actuator. A brake disc 33 passes between the opposed brake shoes and, when the brake is engaged, the shoes are forced towards each other to squeeze the brake disc therebetween to apply a braking force.

The actuator 13 has two independent, double-acting spring-return, diaphragm cylinders 35 and 36 cooperating with the respective opposed arms of the arm means 14 and 15, the cylinders being connected to a pressurized air supply through a conduit and valve means, not shown, so that application of air pressure extends the cylinders to apply the brake. The double-acting cylinder 36 has a first cylinder 38 having an actuator body 39, a diaphragm 40 and a piston member 41, the diaphragm and piston member cooperating with the actuator body to permit the piston member to reciprocate within the body in response to fluid pressure applied to the diaphragm. The double-acting cylinder 36 has a similar second cylinder 43, having a second actuator body 44, a second diaphragm 45 and a second piston member 46 cooperating therewith so as to reciprocate within the second cylinder. The piston members 41 and 46 have piston rods 49 and 50 having outer ends extending from opposite sides of the respective actuator body and cooperating with the opposed outer ends of the arms.

The first cylinder 38 has inner and outer portions 53 and 54, and the second cylinder 43 has inner and outer portions 56 and 57, the inner portions of the cylinders being generally adjacent each other with the respective diaphragms similarly adjacent each other and disposed back-to-back when the actuator is retracted as shown in FIGS. 2. An air chamber 51 is defined in part by opposite faces of the diaphragms 40 and 45 and communicates with the pressurized air supply as described.

The above description relates to a known caliper brake actuating mechanism and commonly in each cylinder a single compression coil spring encircles the piston rod and extends between the outer portion of the cylinder and the piston, ie of the cylinder 38 were a prior art actuator, a spring would extend between a rear face 58 of the piston 47 and the outer portion 54. The spring serves as a return spring to retract the piston after air pressure within the air chamber 51 is reduced. When the brake shoes are worn and the cylinder is fully extended there must be sufficient space to permit the return spring to compress to its limit without excessive interference between adjacent coils of the spring. This requires a particular length of spring which correspondingly requires a particular depth of cylinder which projects outwardly from the assembly in an amount dependent on stroke of the piston and clearance required for essentially complete effective compression of the spring. When the actuator is retracted the outer end of the arm commonly rests against a flat outer portion of the cylinder and overall spacing between opposed outer ends of adjacent arms determines minimum dimension of the assembly. Thus, in the prior art cylinders, length of the spring is one of the major design factors determining overall dimension between opposed outer faces of the actuator.

In the present invention, the cylinder bodies are each adapted to receive at least two, but preferably three, return springs with advantages as will be disclosed. The outer portion 54 of the clyinder 39 has first, second and third projections 61, 62 and 63 extending outwardly therefrom. The projections are hollow cylindrical portions having closed ends and are spaced circumferentially 120° apart around the outer portion 54. The first and second projections 61 and 62 are positioned on a chord 65 disposed parallel to the hinge axis 24 and are spaced apart by a spacing 67 which is sufficient to accept the outer end 30 of the arm 18 therebetween. The third projection 63 is positioned adjacent the outer end of the arm and on a side of the cylinder remote from the inner end 26 of the arm. Thus it can be seen that the three projections are spaced generally symmetrically about the arm, the spacing 67 and position of the projection 63 providing a clearance means to accept the outer end of one of the arms therein. The outer portion 57 of the cylinder 44 is similar and is provided with similar undesignated projections. Thus the outer portion of each cylinder has the similar projections spaced apart to accept outer ends of the respective arms therebetween.

In contrast with the single spring of the prior art actuators, in the first cylinder 38 of the present invention three compression springs 68, 69 and 70 extend between the piston member 41 and the outer portion 54. Outer ends of the springs 68, 69 and 70 are received within and cooperate with the projections 61, 62 and 63 of the portion 54 so as to be located therein to restrict lateral movement of the outer ends. The rear face 59 has a recess 72 to accept an inner end of the spring 70 and has two similar recesses, not shown, to accept inner ends of the springs 68 and 69, so as to restrict lateral movement of inner ends of the springs. The remaining three cylinders are similar and thus three return compression springs extend between the projections in other respective outer portions and the rear faces of the respective pistons, so that each piston member is returned to a retracted position by forces from the three return springs. Because projections are positioned symmetrically circumferentially around the cylinder, force from the springs is combined generally equally to produce essentially axial retraction of the piston member with negligible off-axis movement or twisting thereof.

As best seen in FIG. 2, the projections 62 and 63 have outer faces 75 and 76 positioned so as to be generally coplanar with an outer portion 78 of the outer end 30 of the arm means 14, that is an outer portion of the arm means that is adjacent the cylinder. Similarly, the projections of the second cylinder 44 on an opposite side of the actuator are similarly generally coplanar with an outer portion 80 of the arm means 15 adjacent the cylinder 44. Thus an overall dimension 81 taken across the outer faces of projections on opposite sides of the cylinders is approximately equal to an overall dimension 83 generally across outer portions 78 and 80 of the opposed arms when the arms are in a shoe disengaged position. This results in extreme outer portions of moving portions of the caliper, when disengaged, being generally within planes containing fixed portions of the caliper and thus either the moving or fixed portion of the brake is the sole determinant of maximum dimension of the brake. Clearly as the brake shoes wear the dimension 83 will tend to increase, but nevertheless even with relatively worn shoes the arms will require less space than prior art actuators.

Thus, in summary, it can be seen that by spacing the projections 61 through 63 in such a manner as to provide a clearance recess to accept the outer ends of the arms between ends of the springs, the arms can move within a range in which an overall dimension across the outer ends of the arms is less than would be possible with a single spring as used in the prior art cylinders.

OPERATION

Operation of the air brake follows that of prior art air brakes. Air under pressure is fed into the chamber 51 between the diaphragms which forces apart the diaphragms and the piston members 41 and 46 causing the outer ends of the arms to swing outwards to apply the brakes. When the fluid pressure is reduced, the return springs force the pistons back to the mid-position, thus disengaging the brake shoes from the brake disc.

ALTERNATIVES AND EQUIVALENTS

The caliper brake assembly of FIG. 1 has two double-acting actuators cooperating with arm means which each have two arms. In such an arrangement it has been found that, in each cylinder, three return compression springs spaced 120° apart circumferentially provide an adequate, generally equally applied, axial return force so as to reduce chances of binding of the piston member in the cylinders. In a simplified embodiment one arm of each arm means and three of the four cylinders is eliminated which results in a single-acting diaphragm cylinder extending between opposed single arms, as shown schematically in FIGS. 3 through 5.

FIGS. 3 through 5

An alternative caliper brake assembly 88 has a frame 89, a pair of arms 91 and 92 hinged to the frame and having inner ends 95 and 96 cooperating with opposed brake shoes 97 and 98. The arms have outer ends 99 and 100 cooperating with an actuator 102, which is a single-acting, spring-return diaphragm cylinder having a trunnion mount 103 cooperating with the arm 92. The actuator has an actuator body 104, and a piston member 106 cooperating with the arm 91 and functioning as previously described. The actuator body has a cylinder 109 having inner and outer portions 110 and 111, the inner portion carrying the mount 103 and the outer portion having two hollow projections 114 and 115 positioned on a diameter 116 parallel to a hinge axis 117 of the arm 91 as seen in FIG. 3. The projections are spaced at a spacing 118 which is sufficient to accept the piston member 106 and the outer end 99 of the arm 91 therebetween similarly to the previously described embodiment. The projections have closed outer ends and return compression coil springs 119 and 120 fitted therein extend between the outer portion 111 and the piston member. The springs cooperate with the closed ends of the projections of the cylinder so as to be located therein to restrict lateral movement of the outer ends as in the previously described embodiment. Outer faces 121 and 122 of the projections of the cylinder are similarly positioned so as to be generally coplanar with an outer portion 123 of the arm means adjacent the cylinder.

Thus it can be seen that the spaced projections define a clearance recess to accept the outer ends of the arm, and the springs have outer ends straddling the clearance recess and inner ends cooperating with the piston member so as to retract the piston when fluid pressure is reduced. It can be seen that the simplified caliper brake assembly as disclosed above has similar advantages to the preferred embodiment disclosed in FIGS. 1 and 2. In both structures it can be seen that the clearance recess has a size sufficient to accept the outer end of one of the arm means and is defined in part by an adjacent projecting portion of the cylinder which essentially surrounds the clearance recess. The projecting portion has a closed outer end face which is positioned so as to be generally coplanar with an outer portion of the arm means adjacent the cylinder.

I claim:

1. A caliper brake actuator for use in a caliper brake assembly, the brake assembly having: a frame, a pair of arm means hinged to the frame and having inner ends carrying opposed brake shoes and outer ends adapted to cooperate with the actuator; the actuator having an actuator body, a diaphragm and a piston member, the diaphragm and piston member cooperating with the actuator body to permit the piston member to reciprocate within the body to permit the piston member to reciprocate within the body in response to fluid pressure applied to the diaphragm, the brake actuator being further characterized by:
   (a) the actuator body having a first cylinder having inner and outer portions, one of the portions having an adjacent hollow projecting portion having a closed outer end with an outer face, the projecting portion defining in part a clearance recess having a size sufficient to accept the outer end of one of the arm means therein so that an outer portion of the arm means is essentially coplanar with the outer face of the projecting portion,
   (b) at least two compression springs extending between the piston member and the cylinder, each spring having one end located within the projecting portion and an opposite end cooperating with the piston member, the springs being positioned so as to straddle the clearance recess and to move the piston member when fluid pressure is reduced.

2. A caliper brake actuator as claimed in claim 1 in which:
   (a) the projecting portion has at least two hollow projections to define the clearance recess, the projections being positioned off-centre and symmetrically relative to the outer portion of the cylinder and spaced apart to accept the outer end of the arm means therebetween, the projections having closed outer ends,
   (b) one end of each spring cooperates with a closed end of a respective projection of the cylinder so as to be located therein to restrict lateral movement of the end of the spring.

3. A caliper brake actuator as claimed in claim 2 in which:
   (a) the projections of the projecting portion of the cylinder are cylindrical and have outer faces positioned so as to be generally coplanar with an outer portion of the arm means adjacent the cylinder,
so that an overall dimension across the outer faces of the projections and an opposite portion of the cylinder is approximately equal to an overall dimension across outer portions of the opposed arm means.

4. A caliper brake actuator as claimed in claim 2 in which:
   (a) the two hollow projections are positioned on a diameter disposed parallel to a hinge axis of the arm means.

5. A caliper brake actuator as claimed in claim 1 in which the actuator is further characterized by:
   (a) the actuator body having a second cylinder having inner and outer portions, a second diaphragm and a second piston member cooperating therewith so as to reciprocate within the second cylinder,
   (b) the diaphragms being adjacent each other and disposed back-to-back when the actuator is retracted, an air chamber communicating with a pressurized air supply being defined in part by opposite faces of the diaphragms,
   (c) the piston members of each cylinder having piston rods having outer ends extending from opposite sides of the actuator body and cooperating with opposed outer ends of the arm means,
   (d) the inner portions of the cylinders being generally adjacent each other, and the outer portions of the cylinders having respective projecting portions to define clearance recesses to accept outer ends of the respective arm means therein.

6. A caliper brake actuator as claimed in claim 5 in which:
   (a) each arm means includes respective first and second arms,
   (b) the actuator extends between opposed ends of each arm with the first and second piston members being hinged to the outer ends of the first and second arms respectively,
so that an overall dimension across the projecting portions of the cylinder is approximately equal to an overall dimension across outer portions of the opposed arms.

7. A caliper brake actuator as claimed in claim 5 in which:
   (a) the projecting portions each have at least two hollow projections to define each respective clearance recess, the projections being positioned off-centre and symmetrically relative to the outer portion of the respective cylinder and spaced apart to accept the outer ends of the arm means therebetween, the projections having closed outer ends,
   (b) one end of each spring cooperates with a closed end of a respective projection of the cylinders so as to be located therein to restrict lateral movement of the end of the spring.

8. A caliper brake actuator as claimed in claim 7 further characterized by:
  (a) the projecting portion of each cylinder having first, second and third hollow projections extending outwardly therefrom, the projections having closed outer ends and being spaced circumferentially 120° apart so that the first and second projections are positioned on a chord disposed parallel to a hinge axis of the arm means and spaced apart sufficiently to accept the outer end of the arm means therebetween, and the third projection is positioned adjacent the outer end of the respective arm means and on a side of the cylinder remote from the inner end of the arm means,
  (b) at least three compression springs are provided within each cylinder, each spring having one end cooperating with a respective projection, and an opposite end cooperating with the piston member.

9. A caliper brake actuator as claimed in claim 1, further characterized by:
  (a) the projecting portion of the cylinder having first, second and third hollow projections extending outwardly therefrom, the projections having closed outer ends and being spaced circumferentially 120° apart so that the first and second projections are positioned on a chord disposed parallel to a hinge axis of the arm means and spaced apart sufficiently to accept the outer end of the arm means therebetween, and the third projection is positioned adjacent the outer end of the arm means and on a side of the cylinder remote from the inner end of the arm means,
  (b) at least three compression springs are provided within the cylinder, each spring having one end cooperating with a respective projection and an opposite end cooperating with the piston member.

10. A caliper brake actuator as claimed in claim 1 in which:
  (a) each arm means includes respective first and second arms,
  (b) the actuator extends between opposed ends of each arm with the piston member being hinged to one arm and a portion of the cylinder being hinged to the other arm, so that an overall dimension across the projecting portion of the cylinder and an opposite portion of the cylinder is approximately equal to an overall dimension across outer portions of the opposed arms.

* * * * *